April 19, 1932.  W. ENGEL  1,854,371
ASSEMBLING MACHINE
Filed Aug. 9, 1930  6 Sheets-Sheet 2

INVENTOR
William Engel
BY
Howard P. King
ATTORNEY

April 19, 1932. W. ENGEL 1,854,371
ASSEMBLING MACHINE
Filed Aug. 9, 1930 6 Sheets-Sheet 3

INVENTOR
William Engel
BY
Howard P. King
ATTORNEY

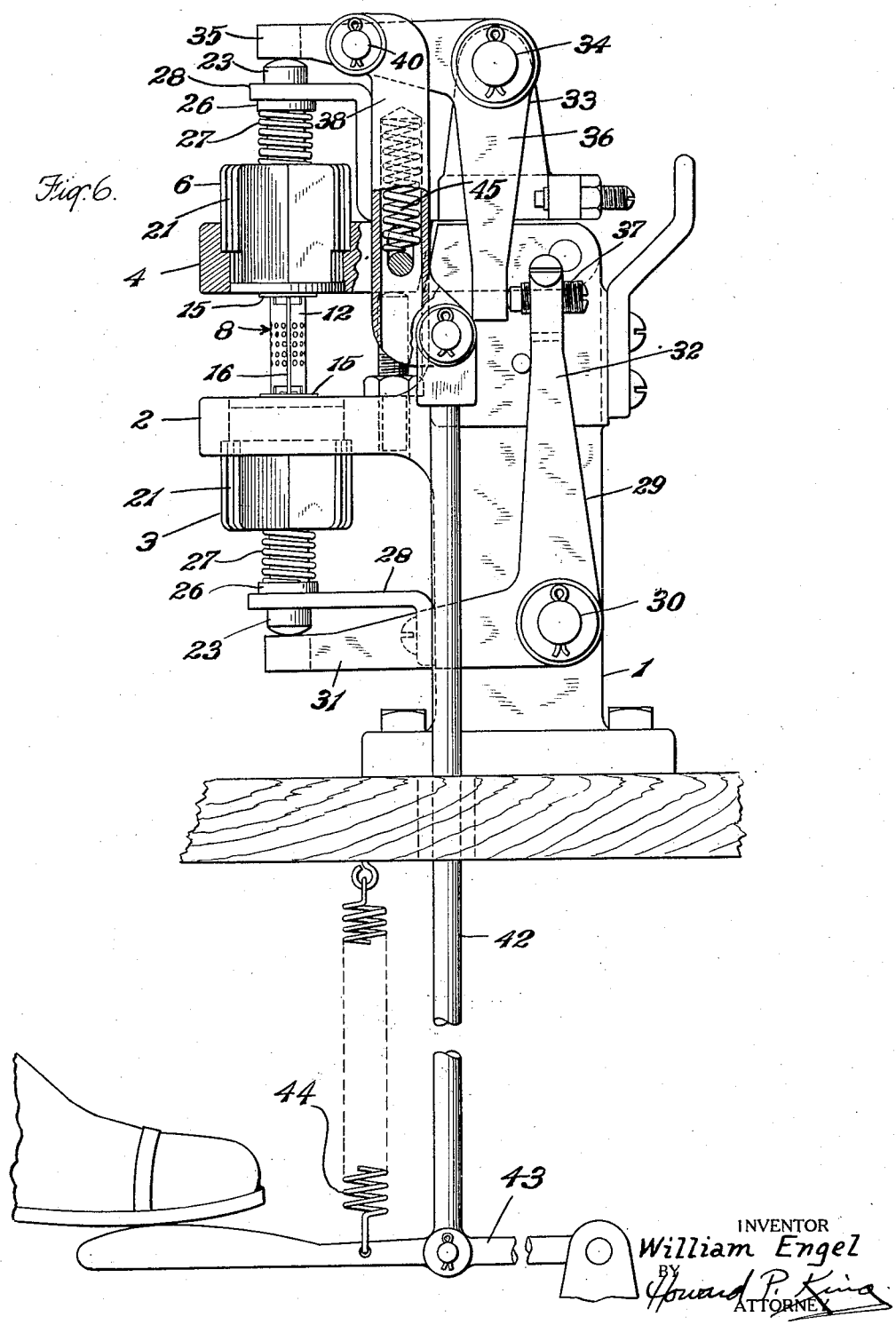

April 19, 1932.   W. ENGEL   1,854,371
ASSEMBLING MACHINE
Filed Aug. 9, 1930   6 Sheets-Sheet 5
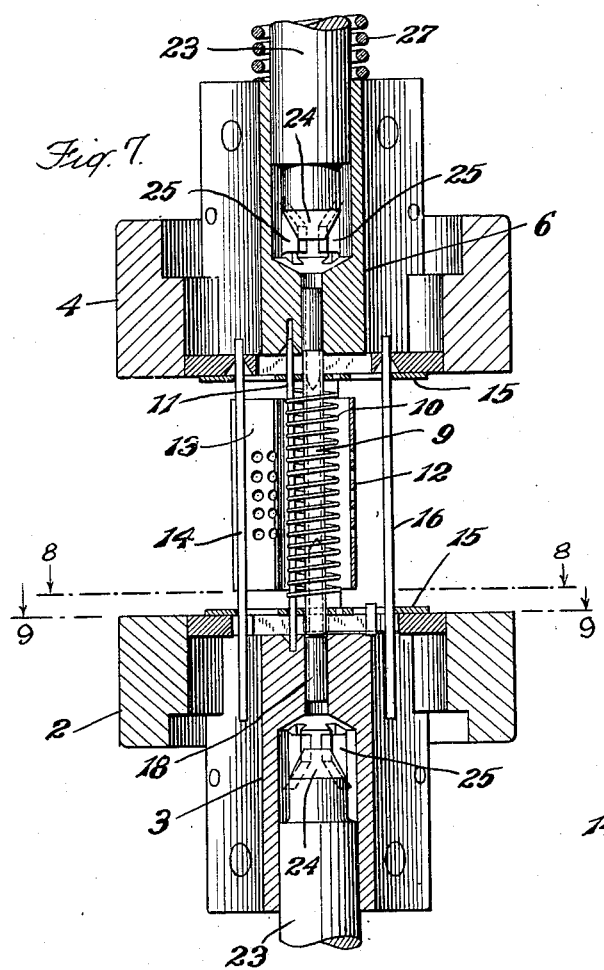
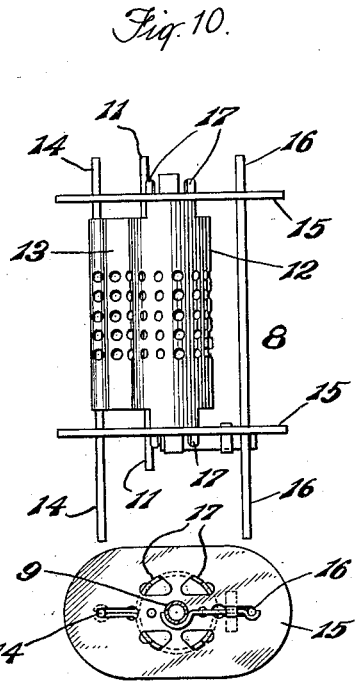
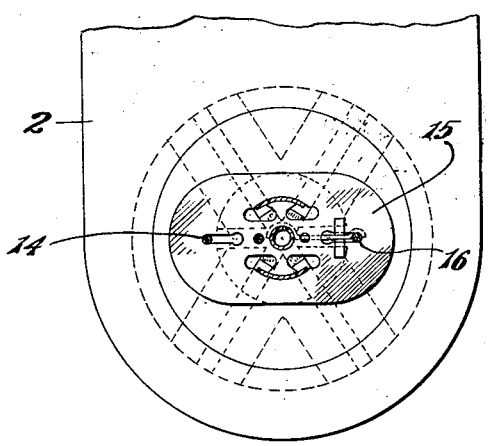
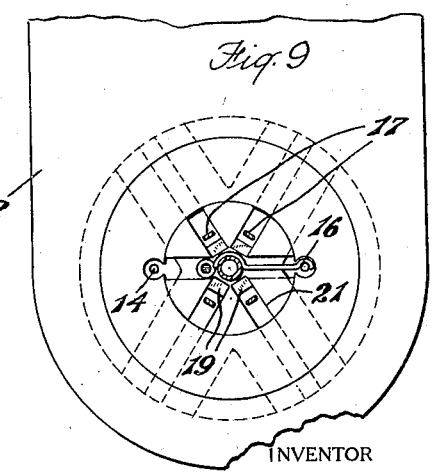
INVENTOR
William Engel
BY Howard P. King
ATTORNEY April 19, 1932.  W. ENGEL  1,854,371
ASSEMBLING MACHINE
Filed Aug. 9, 1930   6 Sheets-Sheet 6
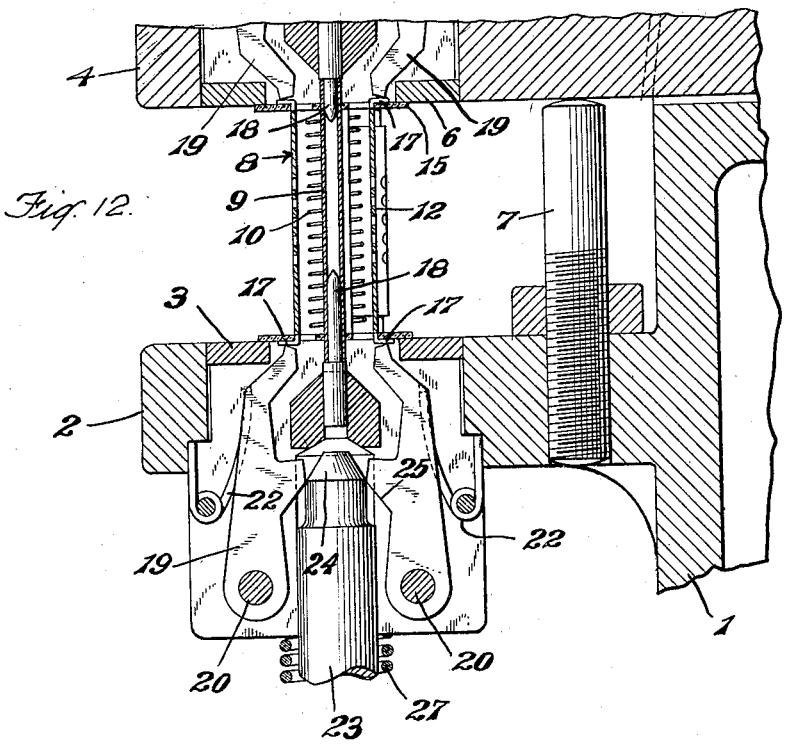
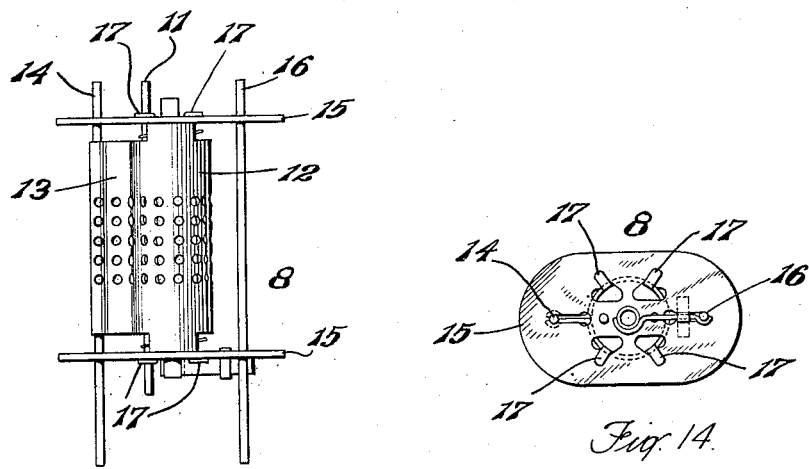
INVENTOR
William Engel
BY
Howard P. King
ATTORNEY Patented Apr. 19, 1932

1,854,371

UNITED STATES PATENT OFFICE

WILLIAM ENGEL, OF NEWARK, NEW JERSEY

ASSEMBLING MACHINE

Application filed August 9, 1930. Serial No. 474,084.

This invention relates to assemblying machines, and more particularly to assemblying machines for elements of radio vacuum tubes.

The objects of the invention are to provide a machine for automatically securing the elements of radio vacuum tubes together in proper relation; to obtain permanent assembly of the elements; to require minimum attention on the part of the operator; to clinch the several parts with one movement by the operator; to give the operator full view of the work in placing the same in the machine; to clinch both ends with one operation; to secure simplicity of construction and operation; and to obtain other advantages and results as may be brought out in the following description.

Referring to the accompanying drawings in which like numerals of reference indicate similar parts throughout the several views:

Figure 6 is a side elevation similar to Fig. 1, but showing parts broken away and showing the head in lowered or closed position;

Figure 7 is a sectional view of the machine, taken on line 7—7 of Fig. 2;

Figure 5:
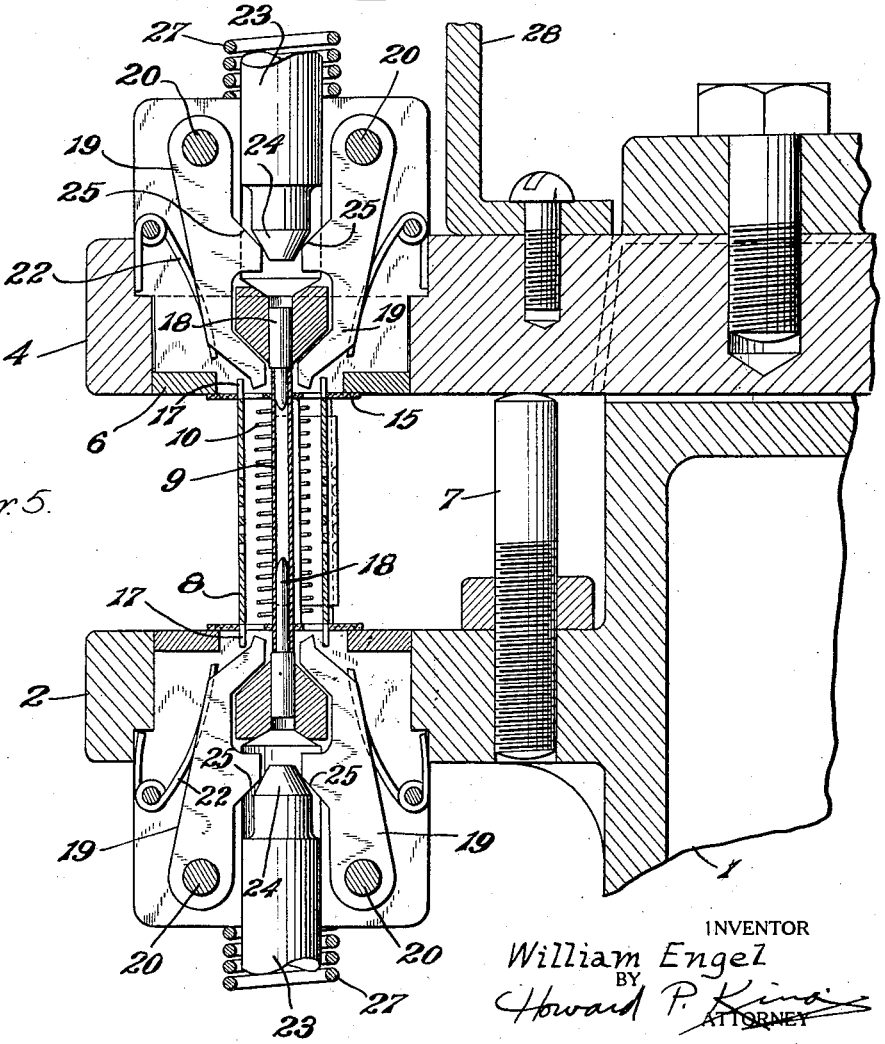
Figure 5 is a sectional view on line 5—5 of Fig. 4.

Figures 8 and 9 are cross sectional views taken on lines 8—8 and 9—9 respectively of Fig. 7;

Figure 10 is an elevation of the several parts being assembled;

Figure 11 is an underneath end view of the same;

Figure 12 is a sectional view similar to Fig. 5, showing the parts operating to clinch the elements together;

Figure 13 is an elevation of the elements after assembly thereof has been completed; and Figure 14 is a plan or end view of the said elements after assembly thereof.

In the specific embodiment of the invention illustrated in said drawings, the reference numeral 1 indicates a fixed support for the various parts, and includes a horizontally disposed work support or table 2 which carries a lower die 3 therein. A head 4 is pivoted, as at 5, to an upper part of the support in such relation to the various parts as to enable the head to be swung down from open or raised position to closed or lowered position at which time the said head is preferably parallel to the said table. The head likewise carries a die 6, which for convenience will be termed the upper or movable die. The lowered position of the head is limited by suitable means, such as adjustable stop 7, so as to not apply too great a pressure upon the work.

The work, designated in general by numeral 8, and as herein disclosed, comprises the several elements of an electron discharge device, namely, a tubular cathode 9, a surrounding grid 10 with supporting wire 11 parallel to the cathode, and an anode 12 surrounding the grid with a longitudinal flange 13 gripping a supporting rod 14. At the ends of this anode are transverse insulatory plates 15 preferably parallel to each other, having appropriate holes to receive the cathode and supporting wire 11 for the grid. The plates 15 likewise have openings to permit passage therethrough of the ends of the anode supporting rod 14. A similar rod 16 is positioned parallel to and diametrically opposite the supporting rod 14, and passes through suitable openings in the plate 15. The anode 12 has longitudinally projecting tabs 17 at its opposite ends, and the plates are provided with openings to receive these tabs therethrough. The present machine operates to hold the plates in place and while the plates are so held, bends the tabs simultaneously at both ends of the work, the bending of the tabs effecting a complete assembly of the parts.

Both the upper and lower dies are preferably identical in structure, each providing suitable holes therein to receive the projecting ends of the several wires 11, 14 and 16 of the work. Furthermore, from the middle of each die is shown a projecting centering pin 18 of appropriate size and shape to receive the tubular cathode thereover as the work is placed in the machine. These centering pins operating in conjunction with the holes for the projecting wires on the work position and hold the work very accurately and positively so that the longitudinally projecting tabs 17 will be very definitely located preparatory to the bending thereof.

Each die provides a plurality of bending arms 19, one for each tab, said arms being pivoted at their ends farthest from the work, as at 20, and extending longitudinally within slots 21 in the die to substantially the face of the die which engages the work. The said bending arms are shaped to enable their work engaging ends to lie close to the centering pins and thus be within the circle defined by the tabs on the work when the work is introduced in the machine. Any suitable springs 22 or other means may be employed for actuating the said arms toward the centering pins into what may be termed normal position.

For swinging the bending arms 19 outward simultaneously, there is provided a plunger 23, here shown as centrally located in alignment with centering pin 18 at the end thereof away from the work. The end of this plunger 23 nearest the work provides a tapered or cam head 24, and each bending arm 19 has a cooperating cam member or dog 25 thereon for engagement by the cam head as the plunger is slid back and forth. The parts are so related that as the plunger is slid toward the work, the plunger head 24 engages said dogs 25 and thereby swing the bending arms 19 outwardly. The simultaneous engagement of said plunger head with all of the dogs in the associated die operates the bending arms all at one time, thus spreading or swinging the several work engaging ends of the arms away from each other. The tabs projecting into the die adjacent to the outer faces of the bending arms will consequently be bent in an outward direction so as to lie flatwise against the insulatory plates 15 of the work, as clearly shown in Figures 12, 13 and 14. As the plunger retracts, springs 22 return the bending arms to their normal position ready for application of the next piece of work which is operated upon in the same manner.

The end of plunger 23 away from the work projects out of the die and at a distance from the die has a collar 26 secured thereon and holding a coil spring 27 between said collar and the die under compression so as to normally retract the plunger, or draw said plunger away from the work. Beyond the collar is shown a fixed bracket 28 through which the outer end of the plunger is guided, the bracket serving as a stop against which collar 26 will engage to limit the outward movement of the said plunger.

Both of the plungers 23 are operated by means of an arm or a bell-crank lever. As here shown one bell-crank lever 29 is pivoted to the fixed support 1 as at 30 and provides a laterally projecting arm 31 which underlies the plunger 23 of the lower die. The other arm 32 of this lower bell-crank lever, projects upwardly at the side of said fixed support 1. The upper die is operated by its bell-crank lever 33 pivoted as at 34 to the head 4 and having one arm 35 extending laterally over the end of the upper plunger 23. The other arm 36 of this upper bell-crank lever extends downwardly with respect to the upper plunger, and is so related to the upwardly projecting arm of the lower bell-crank lever as to lie immediately in front of the lower bell-crank lever where the head 4 is swung down into work engaging position. One of the adjacent arms of said bell-cranks, for instance, the upstanding arm 32 of the lower bell-crank, may have an adjustable means for obtaining engagement between the said arms. As here shown a lateral adjusting screw 37 is provided, the projecting end of which can be brought into engagement with the downwardly projecting end of the upper bell-crank, such that a rearward movement of said upper bell-crank will cause a rearward movement of the lower bell-crank.

The bell-cranks are preferably operated simultaneously by providing a suitable means on the upper bell-crank for swinging the same. As here shown, the means comprises a slide bar 38 slidably mounted as at 39 to the head 4, and pivotally secured at its upper end, as at 40, to the lateral arm 35 of the upper bell-crank.

Figure 1:
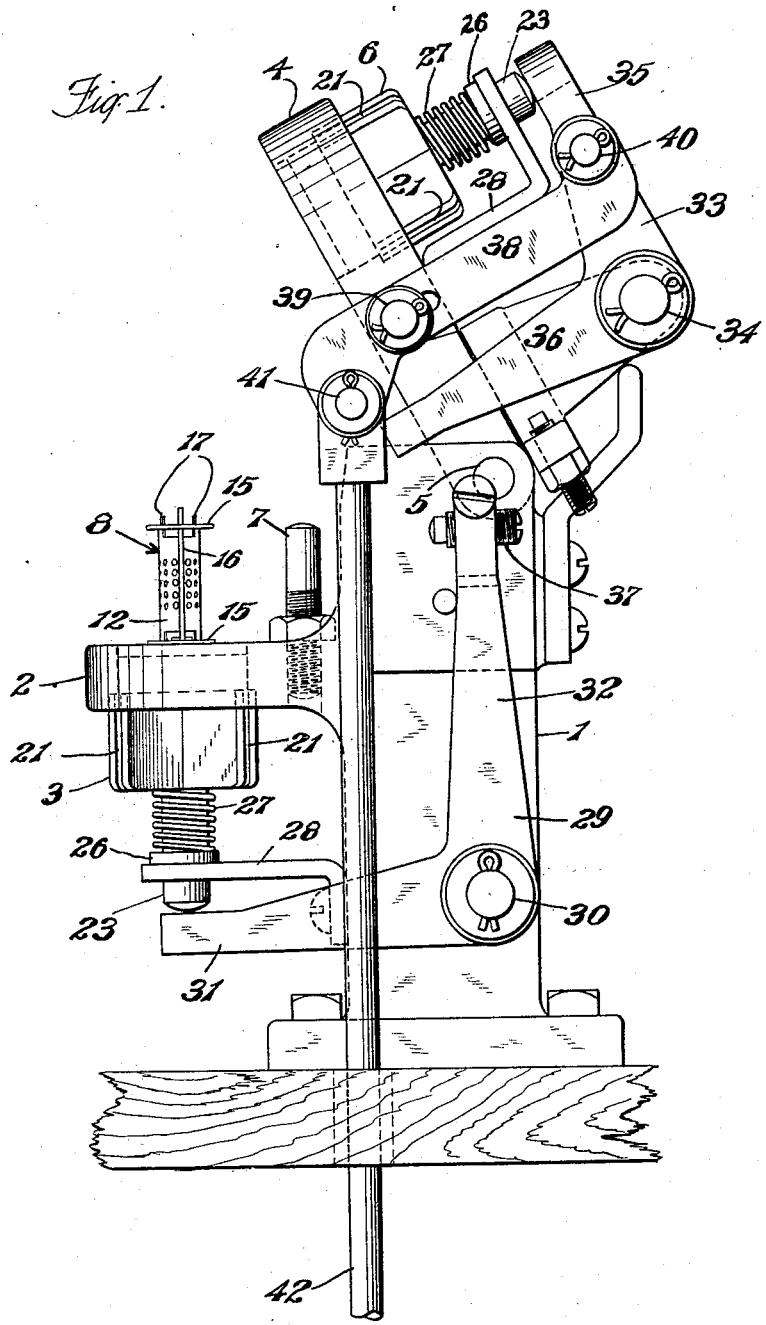
Figure 1 is a side elevation of a machine embodying my invention, showing the head raised or in open position.
Figure 2:
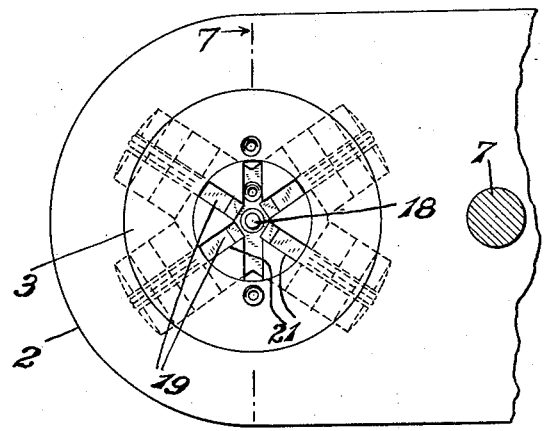
Figure 2 is an underneath face view of the die supporting portion of the head with the die therein.
Figure 3:
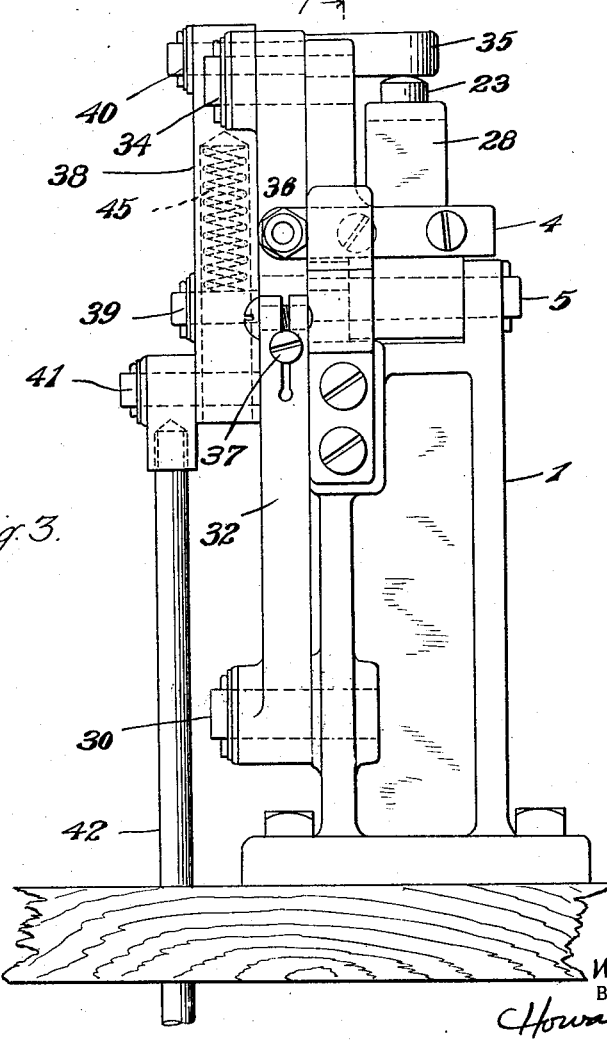
Figure 3 is a rear elevation of the machine.
Figure 4:
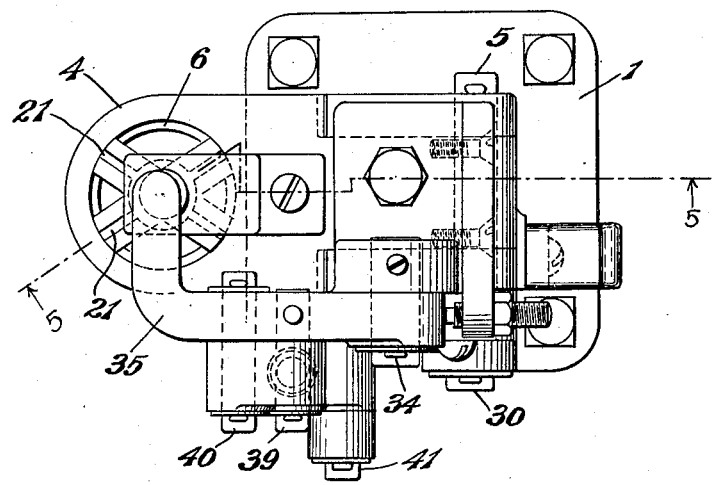
Figure 4 is a plan of the machine.

Below the slidable support 39 the slide bar 38 is pivotally connected as at 41, to a downwardly extending link 42 which may extend substantially to the floor and have a pivotal connection to a foot treadle 43. The treadle 43 may be normally actuated into a raised position by a suitable spring 44, and this upward tendency is transmitted through the link 42 to the head 4. Since the head 4 is pivotally mounted, the upward pressure exerted through the said link 42 will tend to swing the head 4 into upper or open position, as shown in Fig. 1. The slide bar may have additional means therein tending to slide the same upwards and this means, such as a spring 45 within the slide bar, is preferably of sufficient strength to retain the bell-crank in this upward position so as not to operate the plunger 23 until after the swinging head has been brought down to clamping position against the work. This action is further insured by slightly over-setting the pivotal attachment 41 from the link 42 from the line of movement of the slide bar. Consequently the greatest moment of force when the swinging head is in open position and the treadle is depressed, will be transverse to the length of the slide bar, but when the swinging head is brought into lowered or clamping position, the greatest moment of force exerted by the link 42 will be in the longitudinal direction of the slide bar. It will thus be seen that depressing the treadle first obtains a clamping action of the swinging head upon the work, after which the upper bell-crank is swung, that operation then simultaneously swinging the lower bell-crank, so that the two bell-cranks will simultaneously operate the plungers 23 toward each other and obtain a simultaneous bending of all of the tabs at both ends of the work.

Obviously a suitable hand operating means can be substituted for the foot treadle, utilizing a lever if so desired pivoted to the stud 39 with a cam or other engagement with the bell-crank 33, but operating the same. Obviously other detailed changes and modifications can be made in the construction and use of my improved assembling machine without departing from the spirit or scope of the invention, and I do not wish to be understood as limiting myself to the exact structure shown or described except as set forth in the following claims when constructed in the light of the prior art.

Having thus described the invention, I claim:

1. A machine as characterized comprising upper and lower bending arms, upper and lower plungers for operating said bending arms, and means for simultaneously operating said plungers and bending arms.

2. A machine as characterized comprising a fixed support and a swinging head adapted to clamp work therebetween, and bending arms in both the support and the head for operating upon the work.

3. A machine as characterized comprising a fixed support and a swinging head adapted to clamp work therebetween, bending arms in both the support and the head for operating upon the work, and means for simultaneously operating said bending arms.

4. A machine as characterized comprising a table and a head hinged with respect thereto, a plunger for the table, a plunger for the head, a bell crank for operating one plunger, a bell crank for operating the other plunger, and means for operating said bell cranks.

5. A machine as characterized comprising a table and a head hinged with respect thereto, a bell crank on said head movable therewith as the head is swung, a second bell crank pivoted with respect to the table, the bell cranks being positioned so that one engages the other in one position of the head whereby one said bell crank may be operated and its engagement with the other bell crank will operate the second said bell crank.

In testimony whereof I affix my signature.

WILLIAM ENGEL.